United States Patent
Aritomi

(10) Patent No.: US 11,881,360 B2
(45) Date of Patent: Jan. 23, 2024

(54) ELECTROLYTIC CAPACITOR

(71) Applicant: Murata Manufacturing Co., Ltd., Nagaokakyo (JP)

(72) Inventor: Katsutomo Aritomi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/687,840

(22) Filed: Mar. 7, 2022

(65) Prior Publication Data
US 2022/0189704 A1 Jun. 16, 2022

Related U.S. Application Data

(63) Continuation of application No. PCT/JP2020/003729, filed on Jan. 31, 2020.

(30) Foreign Application Priority Data

Sep. 11, 2019 (JP) .................. 2019-165391

(51) Int. Cl.
*H01G 9/012* (2006.01)
*H01G 9/15* (2006.01)
*H01G 9/26* (2006.01)
*H01G 9/08* (2006.01)

(52) U.S. Cl.
CPC ............... *H01G 9/012* (2013.01); *H01G 9/15* (2013.01); *H01G 9/26* (2013.01); *H01G 9/08* (2013.01)

(58) Field of Classification Search
CPC .................................. H01G 9/15; H01G 9/012
See application file for complete search history.

(56) References Cited

U.S. PATENT DOCUMENTS

| 2010/0165547 A1 | 7/2010 | Kuranuki et al. |
| 2017/0140877 A1* | 5/2017 | Kuromi ............... H01G 9/012 |
| 2019/0244765 A1 | 8/2019 | Harada et al. |

FOREIGN PATENT DOCUMENTS

| JP | H04188811 A | 7/1992 |
| JP | H08107039 A | 4/1996 |
| JP | 2008042068 A * | 2/2008 |

(Continued)

OTHER PUBLICATIONS

Written Opinion of the International Searching Authority ssued for PCT/JP2020/003729, dated Apr. 14, 2020.

(Continued)

*Primary Examiner* — Eric W Thomas
(74) *Attorney, Agent, or Firm* — ArentFox Schiff LLP

(57) ABSTRACT

An electrolytic capacitor that includes a resin molded body including a stack that includes a capacitor element with an anode exposed at a first end surface, a dielectric layer on a surface of the anode, and a cathode opposite to the anode and exposed at a second end surface; a first external electrode on the first end surface and electrically connected to the anode; and a second external electrode on the second end surface and electrically connected to the cathode, wherein the first external electrode and the second external electrode each include: a resin electrode layer containing a conductive component and a resin component; and a Ni plating layer on a surface of the resin electrode layer, wherein a ratio of a thickness of the resin electrode layer to a thickness of the Ni plating layer is 5 or less.

13 Claims, 2 Drawing Sheets

Cross-sectional view taken along line A-A

(56) References Cited

FOREIGN PATENT DOCUMENTS

| JP | 2010062406 A | * | 3/2010 |
| WO | 2009028183 A1 | | 3/2009 |
| WO | 2018074408 A1 | | 4/2018 |

OTHER PUBLICATIONS

International Search Report issued for PCT/JP2020/003729, dated Apr. 14, 2020.

* cited by examiner

Cross-sectional view taken along line A-A

ELECTROLYTIC CAPACITOR

CROSS REFERENCE TO RELATED APPLICATIONS

The present application is a continuation of International application No. PCT/JP2020/003729, filed Jan. 31, 2020, which claims priority to Japanese Patent Application No. 2019-165391, filed Sep. 11, 2019, the entire contents of each of which are incorporated herein by reference.

FIELD OF THE INVENTION

The present invention relates to an electrolytic capacitor.

BACKGROUND OF THE INVENTION

Patent Literature 1 discloses a solid electrolytic capacitor including a capacitor element, a package made of an insulating resin covering the capacitor element, a first base electrode provided at a first end surface of the package from which a first positive electrode body is exposed, and coupled with the first positive electrode body, a first diffusion layer provided between the first positive electrode body and the first base electrode, a first external electrode provided on the first base electrode, and a second external electrode connected to a first negative electrode layer.

Patent Literature 1 discloses an external electrode including a middle electrode such as a silver paste layer provided on the base electrode and an outer electrode such as a solder plating layer or a nickel plating layer provided on the outside of the middle electrode.

Patent Literature 1: WO 2009/028183

SUMMARY OF THE INVENTION

However, when the solid electrolytic capacitor disclosed in Patent Literature 1 is subjected to a reflow treatment or the like in which the solid electrolytic capacitor is heat treated at a temperature of 150° C. to 260° C., organic components such as a plasticizer and water in the silver paste layer may expand explosively and cause scattering of molten solder, i.e., solder explosion.

It is possible to prevent or reduce solder explosion by reducing the amounts of the organic components and water in the silver paste layer. However, since the insulating resin covering the capacitor element and a solid electrolyte layer inside the capacitor element also contain organic components and water, it has not been possible to completely prevent solder explosion merely by adjusting the amounts of the organic components and water in the silver paste layer.

Thus, the present invention aims to provide an electrolytic capacitor capable of preventing solder explosion.

An electrolytic capacitor of the present invention includes a resin molded body having opposed first and second end surfaces, the resin molded body including a stack that includes a capacitor element with an anode exposed at the first end surface, a dielectric layer on a surface of the anode, and a cathode opposite to the anode and exposed at the second end surface, and a sealing resin that encloses the stack; a first external electrode on the first end surface of the resin molded body and electrically connected to the anode; and a second external electrode on the second end surface of the resin molded body and electrically connected to the cathode, wherein the first external electrode and the second external electrode each include: a resin electrode layer containing a conductive component and a resin component; and a Ni plating layer on a surface of the resin electrode layer, wherein a ratio of a thickness of the resin electrode layer to a thickness of the Ni plating layer is 5 or less.

The present invention can provide an electrolytic capacitor capable of preventing solder explosion.

DETAILED DESCRIPTION OF THE PREFERRED EMBODIMENTS

An electrolytic capacitor of the present invention is described below.

The present invention is not limited to the following preferred embodiments, and may be suitably modified without departing from the gist of the present invention. Combinations of two or more preferred features described in the following preferred embodiments are also within the scope of the present invention.

Figure 1:
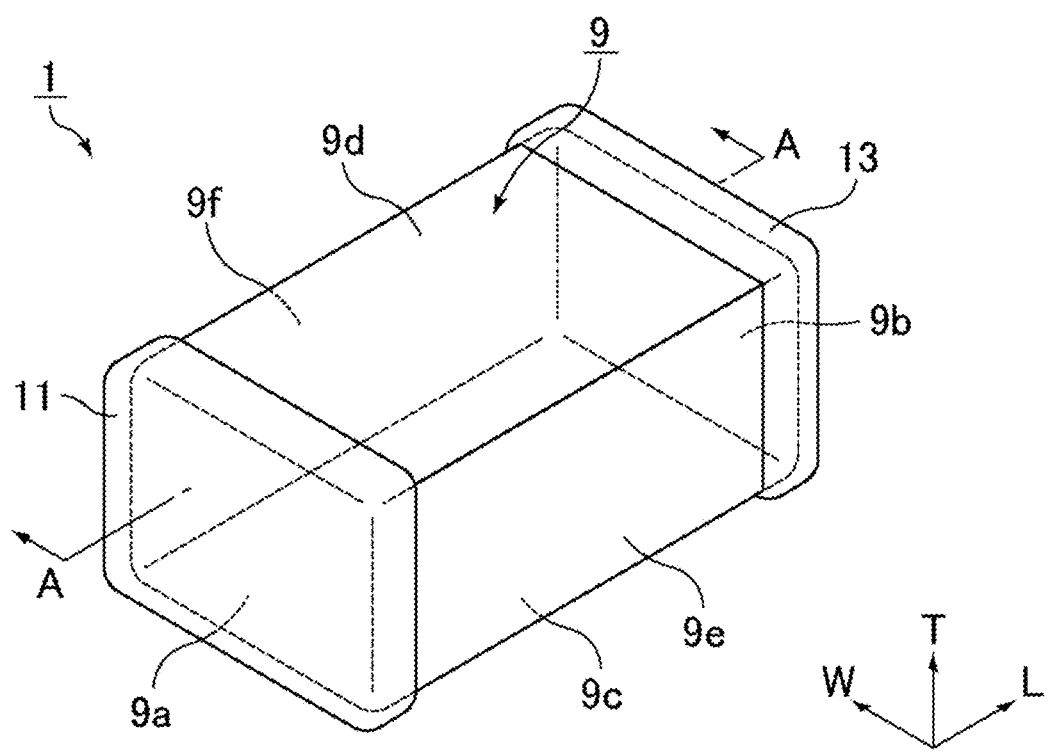
FIG. 1 is a schematic perspective view of an example of an electrolytic capacitor of the present invention.

FIG. 1 is a schematic perspective view of an example of an electrolytic capacitor of the present invention.

FIG. 1 shows a resin molded body 9 defining an electrolytic capacitor 1. Preferably, the resin molded body is cuboidal in shape.

The resin molded body 9 has a length direction (L direction), a width direction (W direction), and a thickness direction (T direction), and includes a first end surface 9a and a second end surface 9b which are opposite to each other in the length direction. A first external electrode 11 is formed on the first end surface 9a, and a second external electrode 13 is formed on the second end surface 9b.

The resin molded body 9 includes a bottom surface 9c and a top surface 9d which are opposite to each other in the thickness direction.

The resin molded body 9 also includes a first side surface 9e and a second side surface 9f which are opposite to each other in the width direction.

Herein, a plane along the length direction (L direction) and the thickness direction (T direction) of the electrolytic capacitor or the resin molded body is referred to as an "LT plane", a plane along the length direction (L direction) and the width direction (W direction) is referred to as an "LW plane", and a plane along the thickness direction (T direction) and the width direction (W direction) is referred to as a "WT plane".

Figure 2:
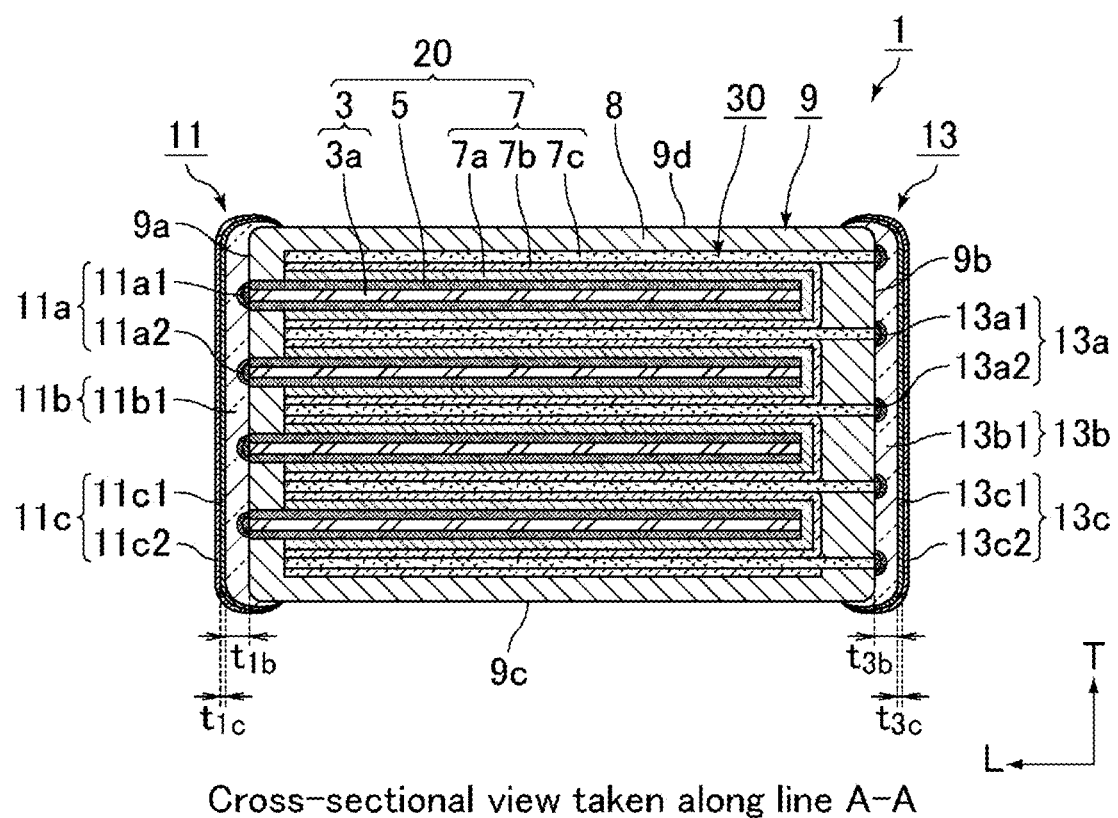
FIG. 2 is a cross-sectional view taken along line A-A of the electrolytic capacitor shown in FIG. 1.

FIG. 2 is a cross-sectional view taken along line A-A of the electrolytic capacitor shown in FIG. 1.

FIG. 2 shows a capacitor element 20 that includes an anode 3 with a dielectric layer 5 on its surface and a cathode 7 opposite to the anode 3.

Multiple such capacitor elements 20 are stacked to form a stack 30, and the stack 30 is enclosed in a sealing resin 8, wherein the resin molded body 9 is obtained. In the stack 30, the capacitor elements 20 may be bonded to each other via a conductive adhesive (not shown).

The first external electrode 11 is formed on the first end surface 9a of the resin molded body 9, and the first external electrode 11 is electrically connected to the anode 3 exposed at the first end surface 9a.

The second external electrode 13 is formed on the second end surface 9b of the resin molded body 9, and the second external electrode 13 is electrically connected to the cathode 7 exposed at the second end surface 9b.

The anode 3 defining the capacitor element 20 includes valve-action metal foil 3a in the center and a porous layer such as an etched layer (not shown) on the surface. The dielectric layer 5 is on the surface of the porous layer.

Examples of the valve-action metal include elemental metals such as aluminum, tantalum, niobium, titanium, zirconium, magnesium, silicon, and alloys containing these metals. Of these, aluminum and an aluminum alloy are preferred.

The valve-action metal may have any shape, but it is preferably flat, and is more preferably formed in foil. The porous layer is preferably an etched layer that has been etched with hydrochloric acid or the like.

The thickness of the valve-action metal foil before etching is preferably 60 μm to 180 μm. The thickness of the non-etched valve-action metal foil (core) after etching is preferably 10 μm to 70 μm. The thickness of the porous layer is designed according to the withstand voltage and capacitance required for the electrolytic capacitor, but the thickness of the porous layer including the porous layers on both sides of the valve-action metal foil is preferably 10 μm to 120 μm.

The anode 3 is led out to the first end surface 9a of the resin molded body 9 and electrically connected to the first external electrode 11.

The dielectric layer is preferably formed of an oxide film of the valve-action metal. For example, when aluminum foil is used as a valve-action metal substrate, the aluminum foil is anodized in an aqueous solution containing boric acid, phosphoric acid, adipic acid, a sodium salt or an ammonium salt thereof, or the like, whereby an oxide film that serves as a dielectric layer can be formed.

The dielectric layer is formed along the surface of the porous layer, whereby pores (recesses) are formed in the dielectric layer. The thickness of the dielectric layer is designed according to the withstand voltage and capacitance required for the electrolytic capacitor, but the thickness of the dielectric layer is preferably 10 nm to 100 nm.

The cathode 7 defining the capacitor element 20 is a stack including a solid electrolyte layer 7a formed on the dielectric layer 5, a conductive layer 7b formed on the solid electrolyte layer 7a, and a cathode lead-out layer 7c formed on the conductive layer 7b.

The electrolytic capacitor including a solid electrolyte layer as part of the cathode is considered to be a solid electrolytic capacitor.

Examples of materials defining the solid electrolyte layer include a conductive polymer having a pyrrole, thiophene, or aniline skeleton. A conductive polymer having a thiophene skeleton is, for example, poly(3,4-ethylenedioxythiophene) (PEDOT), and may be PEDOT:PSS which is a complex with a dopant (poly(styrene sulfonate) (PSS)).

The solid electrolyte layer is formed by, for example, a method in which a polymerized film of poly(3,4-ethylenedioxythiophene) or the like is formed on the surface of the dielectric layer using a treatment liquid containing a monomer such as 3,4-ethylenedioxythiophene or a method in which a dispersion of a polymer such as poly(3,4-ethylenedioxythiophene) is applied to the surface of the dielectric layer and dried. Formation of the solid electrolyte layer for an inner layer for filling the pores (recesses) is preferably followed by formation of a solid electrolyte layer for an outer layer for covering the entire dielectric layer.

The solid electrolyte layer can be formed in a predetermined region by applying the treatment liquid or dispersion to the dielectric layer by, for example, sponge transfer, screen printing, spray coating, inkjet printing, or using a dispenser. The thickness of the solid electrolyte layer is preferably 2 μm to 20 μm.

The conductive layer is disposed to electrically and mechanically connect the solid electrolyte layer to the cathode lead-out layer. For example, the conductive layer is preferably a carbon layer, a graphene layer, or a silver layer formed by applying a conductive paste such as a carbon paste, a graphene paste, or a silver paste. The conductive layer may be a composite layer in which a silver layer is disposed on a carbon layer or a graphene layer, or a mixed layer containing a mixture of a carbon paste or a graphene paste with a silver paste.

The conductive layer can be formed on the solid electrolyte layer by applying a conductive paste such as a carbon paste by, for example, sponge transfer, screen printing, spray coating, inkjet printing, or using a dispenser. Preferably, a cathode lead-out layer formed in the subsequent step is stacked while the conductive layer is viscous before drying. The thickness of the conductive layer is preferably 2 μm to 20 μm.

The cathode lead-out layer can be formed from metal foil or a printed electrode layer.

In the case of the metal foil, the metal foil preferably contains at least one metal selected from the group consisting of Al, Cu, Ag, and an alloy mainly containing any of these metals. When the metal foil contains any of these metals, the metal foil can have a lower resistance value, and ESR can be reduced.

Alternatively, the metal foil may be one whose surface is coated with carbon or titanium by a film forming method such as sputtering or vapor deposition. Use of carbon-coated Al foil is more preferred. The thickness of the metal foil is not limited, but it is preferably 20 μm to 50 μm, in view of better handling during production, smaller size, and lower ESR.

In the case of the printed electrode layer, the cathode lead-out layer can be formed in a predetermined region by applying an electrode paste to the conductive layer by, for example, sponge transfer, screen printing, spray coating, inkjet printing, or using a dispenser. The electrode paste is preferably one mainly containing Ag, Cu, or Ni. When the cathode lead-out layer is a printed electrode layer, the printed electrode layer can made thinner than the cathode lead-out layer formed from metal foil. In the case of screen printing, the printed electrode layer can have a thickness of 2 μm to 20 μm.

The cathode lead-out layer 7c is led out to the second end surface 9b of the resin molded body 9 and electrically connected to the second external electrode 13.

The sealing resin 8 defining the resin molded body 9 at least contains a resin, and preferably contains a resin and a filler. Examples of the resin preferably include epoxy resins, phenol resins, polyimide resins, silicone resins, polyamide resins, and liquid crystal polymers. The sealing resin 8 can be used in the form of either a solid resin or a liquid resin. Examples of the filler preferably include silica particles, alumina particles, and metal particles. Use of a material obtained by adding silica particles to a solid epoxy resin and a phenol resin is more preferred.

When a solid sealing material is used, the resin molded body is preferably formed by a method that uses a resin mold such as a compression mold or a transfer mold, with a compression mold being more preferably used. When a liquid sealing material is used, the resin molded body is preferably formed by a method that uses a dispenser or printing. Preferably, a compression mold is used to enclose the stack 30 of the capacitor elements 20 each including the anode 3, the dielectric layer 5, and the cathode 7 in the sealing resin 8 to produce the resin molded body 9.

The resin molded body 9 preferably has a cuboidal shape, and includes the top surface 9d and the bottom surface 9c as the LW planes, the first side surface 9e and the second side surface 9f as the LT planes, and the first end surface 9a and the second end surface 9b as the WT planes.

Preferably, each corner of the resin molded body 9 after molded in a resin mold is rounded to have an R (curvature radius) by barrel polishing. A resin molded body is softer than a ceramic body and it is thus difficult to round each corner to have an R by barrel polishing. Yet, each corner can be rounded to have a small curvature radius R by adjusting the composition, particle size, and shape of a medium, treatment time in a barrel, and the like.

A detailed description is given below on the configurations of the external electrodes included in the electrolytic capacitor of the present invention.

The first external electrode and the second external electrode of the electrolytic capacitor of the present invention each include a resin electrode layer containing a conductive component and a resin component, and a Ni plating layer on a surface of the resin electrode layer.

Although the external electrodes may not necessarily include any other plating layers, the following description is given on the first external electrode and the second external electrode each including an inner plating layer, a resin electrode layer, and an outer plating layer with reference to FIG. 2.

The Ni plating layer on the surface of each resin electrode layer is a part of the corresponding outer plating layer.

The resin electrode layers shown in FIG. 2 are printed resin electrode layers formed by screen printing of an electrode paste.

FIG. 2 shows layer structures of the first external electrode 11 and the second external electrode 13 included in the electrolytic capacitor 1.

The first external electrode 11 includes an inner plating layer 11a, a resin electrode layer 11b, and an outer plating layer 11c. The inner plating layer 11a includes a Ni plating layer 11a1 and a Ag plating layer 11a2. The outer plating layer 11c includes a Ni plating layer 11c1 and a Sn plating layer 11c2. The resin electrode layer 11b includes a Ag printed resin electrode layer 11b1.

The second external electrode 13 includes an inner plating layer 13a, a resin electrode layer 13b, and an outer plating layer 13c. The inner plating layer 13a includes a Ni plating layer 13a1 and a Ag plating layer 13a2. The outer plating layer 13c includes a Ni plating layer 13c1 and a Sn plating layer 13c2. The resin electrode layer 13b includes a Ag printed resin electrode layer 13b1.

In the electrolytic capacitor of the present invention, the first external electrode and the second external electrode may not necessarily include the inner plating layers 11a and 13a, respectively, shown in FIG. 2.

The Ni plating layers 11c1 and 13c1 are Ni plating layers provided on the respective surfaces of the resin electrode layers.

It suffices if the outer plating layers 11c and 13c include the Ni plating layers 11c1 and 13c1, respectively. Thus, the Sn plating layers 11c2 and 13c2 may not necessarily be formed.

In the first external electrode 11, the ratio of a thickness $t_{1b}$ of the resin electrode layer 11b to a thickness $t_{1c}$ of the Ni plating layer 11c1 is 5 or less (about 4 in FIG. 2), preferably 2 to 4.

In the second external electrode 13, the ratio of a thickness $t_{3b}$ of the resin electrode layer 13b to a thickness $t_{3c}$ of the Ni plating layer 13c1 is 5 or less (about 4 in FIG. 2), preferably 2 to 4.

When the ratio of the thickness ($t_{1b}$, $t_{3b}$) of the resin electrode layer to the thickness ($t_{1c}$, $t_{3c}$) of the Ni plating layer is 5 or less, the Ni plating layer is sufficiently thick relative to the thickness of the resin electrode layer. Thus, even when the organic components and water in the resin electrode layer expand explosively by heating during reflow, the Ni plating layer not melted by reflow can prevent solder explosion.

Preferably, the Ni plating layer 11a1 of the inner plating layer 11a is formed by a zincate treatment. In other words, the surface of aluminum foil of the anode 3 exposed at the first end surface of the resin molded body 9 is alkaline etched to remove an oxide film of the anode 3, and Zn plating is then performed. Subsequently, electroless Ni plating is performed as displacement plating, whereby the Ni plating layer 11a1 is formed.

A Ni plating layer 13a1 of the inner plating layer 13a can also be formed by the same method as that of the Ni plating layer 11a1, but the zincate treatment may not necessarily be performed. Yet, the zincate treatment is preferably performed when the cathode lead-out layer 7c contains Al.

The Ag plating layers 11a2 and 13a2 as the inner plating layers are formed to prevent oxidation of the Ni plating layers 11a1 and 13a1, respectively. Ag plating is continuously performed without exposing the electroless Ni plated layers to an atmosphere.

Each inner plating layer covers an area slightly larger than a surface of the anode or cathode exposed at the first or second end surface, respectively, of the stack. Thus, the inner plating layers achieve an effect of blocking the movement of water from the solid electrolyte layers to the resin electrode layers.

The resin electrode layers 11b and 13b each contain a conductive component and a resin component.

The conductive component preferably mainly contains Ag, Cu, Ni, Sn, or the like, and the resin component preferably mainly contains an epoxy resin, a phenol resin, or the like.

Preferably, each resin electrode layer contains the conductive component in an amount of 67 wt % to 97 wt % and the resin component in an amount of 3 wt % to 33 wt %.

More preferably, each resin electrode layer contains the conductive component in an amount of 72 wt % to 95 wt % and the resin component in an amount of 5 wt % to 28 wt %.

More preferably, each resin electrode layer contains the conductive component in an amount of 78 wt % to 95 wt % and the resin component of 5 wt % to 22 wt %.

Still more preferably, each resin electrode layer contains the conductive component in an amount of 79 wt % to 89 wt % and the resin component of 11 wt % to 21 wt %.

Preferably, the resin electrode layers are printed resin electrode layers formed by screen printing an electrode paste. Here, preferably, the electrode paste is a Ag electrode paste containing a resin and a Ag filler containing Ag as a conductive component, and more preferably, the resin electrode layers are Ag printed resin electrode layers formed by screen printing.

When the resin electrode layers are printed resin electrode layers, the external electrodes can be made flat, as compared to the case where the resin electrode layers are formed by dipping in the electrode paste. In other words, the first external electrode and the second external electrode have better thickness uniformity.

When the flatness of each of the first external electrode and the second external electrode is measured in a cross section as shown in FIG. 2, preferably, the variation in thickness of the first external electrode measured from the first end surface of the resin molded body and the variation in thickness of the second external electrode measured from the second end surface of the resin molded body do not exceed 30 μm. More preferably, the variation in thickness is 20 μm or less. Still more preferably, the variation in thickness is 5 μm or less.

The variation in thickness can be determined from a difference between a maximum thickness and a minimum thickness of the first external electrode or the second external electrode, as measured at five points in total including three points that divide the stack into four equal parts from the top surface to the bottom surface as well as the top surface and the bottom surface of the stack in a cross-sectional view as shown in FIG. 2. The thickness can also be measured non-destructively at multiple points using an X-ray fluorescence film thickness meter, a laser displacement meter, or the like.

When the resin electrode layers are printed resin electrode layers formed by screen printing an electrode paste, the electrode paste preferably contains the conductive component in an amount of 60 wt % to 95 wt % and the resin component in an amount of 3 wt % to 30 wt %.

More preferably, the electrode paste contains the conductive component in an amount of 65 wt % to 90 wt % and the resin component in an amount of 5 wt % to 25 wt %.

More preferably, the electrode paste contains the conductive component in an amount of 70 wt % to 90 wt % and the resin component in an amount of 5 wt % to 20 wt %.

Still more preferably, the electrode paste contains the conductive component in an amount of 75 wt % to 85 wt % and the resin component in an amount of 10 wt % to 20 wt %.

The electrode paste may contain an organic solvent. The organic solvent is preferably a glycol ether-based solvent. Examples include diethylene glycol monobutyl ether and diethylene glycol monophenyl ether.

An additive may be used if necessary. The additive is useful in adjusting the rheology, especially thixotropy, of the electrode paste. The amount of the additive is preferably less than 5 wt % relative to the weight of the electrode paste.

The Ni plating layers 11c1 and 13c1 of the outer plating layers 11c and 13c, respectively, are formed mainly to prevent solder explosion and to improve moisture resistance. The Sn plating layers 11c2 and 13c2 are formed mainly to improve solderability.

The thickness of the Ni plating layer on the surface of each resin electrode layer is preferably 10 μm or less, more preferably 8 μm or less.

The thickness of the Ni plating layer on the surface of each resin electrode layer is preferably 1 μm or more, more preferably 2 μm or more.

Examples of preferred dimensional ranges of the electrolytic capacitor of the present invention are as described below.

Dimensions of multilayer capacitor

Dimension of L: 3.4 mm to 3.8 mm; representative value: 3.5 mm

Dimension of W: 2.7 mm to 3.0 mm; representative value: 2.8 mm

Dimension of T: 1.8 mm to 2.0 mm; representative value: 1.9 mm

The electrolytic capacitor of the present invention that has been described so far can be produced by the following method, for example.

Production of Capacitor Element

A valve-action metal foil, such as aluminum foil, having a porous layer such as an etched layer on its surface is prepared, and a surface of the porous layer is anodized to form a dielectric layer.

A solid electrolyte layer is formed on the dielectric layer by screen printing. Subsequently, a carbon layer is formed on the solid electrolyte layer by screen printing, and further, a cathode lead-out layer is formed on the carbon layer by sheet stacking or screen printing.

A capacitor element is obtained by the above steps.

Stacking of Capacitor Elements and Sealing with Resin

Multiple capacitor elements are formed into a stack, and the stack is sealed with a sealing resin in a compression mold to obtain a resin molded body.

Formation of External Electrodes

An electrode paste is screen printed on the first end surface of the resin molded body, and the electrode paste is then thermally cured to form a first external electrode.

The electrode paste is also screen printed on the second end surface of the resin molded body, and the electrode paste is then thermally cured to form a second external electrode.

The electrode paste contains a conductive component and a resin component. The resin electrode layers thus formed are printed resin electrode layers.

Preferably, the electrode paste used in this step contains the conductive component in an amount of 67 wt % to 97 wt % and the resin component in an amount of 3 wt % to 33 wt %.

More preferably, the electrode paste contains the conductive component in an amount of 72 wt % to 95 wt % and the resin component in an amount of 5 wt % to 28 wt %.

More preferably, the electrode paste contains the conductive component in an amount of 78 wt % to 95 wt % and the resin component of 5 wt % to 22 wt %.

Still more preferably, the electrode paste contains the conductive component in an amount of 79 wt % to 89 wt % and the resin component in an amount of 11 wt % to 21 wt %.

The electrode paste may contain an organic solvent. The organic solvent is preferably a glycol ether-based solvent. Examples include diethylene glycol monobutyl ether and diethylene glycol monophenyl ether.

An additive may be used if necessary. The amount of the additive is preferably less than 5 wt % relative to the weight of the electrode paste.

Preferably, the zincate treatment is performed before screen printing the electrode paste, and a Ni plating layer is formed as an inner plating layer by the zincate treatment and displacement plating.

Preferably, a Ag plating layer is further formed as the inner plating layer on the Ni plating layer.

Preferably, the electrolytic capacitor includes the inner plating layer on at least one of the surface of the anode exposed at the first end surface or the surface of the cathode exposed at the second end surface.

A Ni plating layer is formed as an outer plating layer. Preferably, the electrolytic capacitor further includes a Sn plating layer on a surface of the Ni plating layer.

The outer plating layer is formed on each of the printed resin electrode layers serving as the first external electrode and the second external electrode.

The electrolytic capacitor of the present invention can be produced by the above steps.

The stack including the capacitor elements preferably includes multiple capacitor elements but may include only one capacitor element.

EXAMPLES

The following describes examples subjected to evaluation of solder explosion and stress-induced peeling. The present invention is not limited to these examples.

to determine the occurrence or nonoccurrence of stress-induced peeling between the resin electrode layer and the Ni plating layer.

The samples were comprehensively evaluated based on the following criteria from the results of solder explosion and stress-induced peeling.

Excellent: Solder explosion and stress-induced peeling are both prevented.

Good: Solder explosion is prevented, but stress-induced peeling is not prevented.

Poor: Solder explosion is not prevented.

TABLE 1

|  | Thickness of resin electrode layer [μm] | Thickess of Ni plating layer [μm] | Thickness ratio | Defect due to solder explosion | Stress-induced peeling between resin electrode layer and Ni plating layer | Comprehensive evaluation |
| --- | --- | --- | --- | --- | --- | --- |
| Sample 1 | 50 | 10 | 5 | 0/100 | 3/100 | Good |
| Sample 2* | 50 | 7 | 7.1 | 3/100 | 0/100 | Poor |
| Sample 3* | 50 | 5 | 10 | 5/100 | 0/100 | Poor |
| Sample 4 | 30 | 10 | 3 | 0/100 | 2/100 | Good |
| Sample 5 | 30 | 8 | 3.8 | 0/100 | 0/100 | Excellent |
| Sample 6 | 30 | 7 | 4.3 | 0/100 | 0/100 | Excellent |
| Sample 7 | 30 | 6 | 5 | 0/100 | 0/100 | Excellent |
| Sample 8* | 30 | 4 | 7.5 | 2/100 | 0/100 | Poor |
| Sample 9 | 20 | 8 | 2.5 | 0/100 | 0/100 | Excellent |
| Sample 10 | 20 | 7 | 2.9 | 0/100 | 0/100 | Excellent |
| Sample 11 | 20 | 6 | 3.3 | 0/100 | 0/100 | Excellent |
| Sample 12 | 20 | 5 | 4 | 0/100 | 0/100 | Excellent |
| Sample 13 | 20 | 4 | 5 | 0/100 | 0/100 | Excellent |
| Sample 14* | 20 | 2 | 10 | 4/100 | 0/100 | Poor |
| Sample 15 | 10 | 7 | 1.4 | 0/100 | 0/100 | Excellent |
| Sample 16 | 10 | 5 | 2 | 0/100 | 0/100 | Excellent |
| Sample 17 | 10 | 3 | 3.3 | 0/100 | 0/100 | Excellent |
| Sample 18 | 10 | 2 | 5 | 0/100 | 0/100 | Excellent |
| Sample 19* | 10 | 1.5 | 6.7 | 3/100 | 0/100 | Poor |

Samples with asterisk (*) are not the electrolytic capacitors of the present invention.

The relationship between the thickness of the resin electrode layer, the thickness of the Ni plating layer, and solder explosion was evaluated by the following procedure.

The stack configured as shown in FIG. 1 and FIG. 2 was sealed with a sealing resin containing an epoxy resin and silica particles to obtain a resin molded body. Subsequently, Ni/Ag plating was applied to inner layers, and a Ag electrode paste was applied by screen printing to end surfaces (a first end surface and a second end surface) of the resin molded body, followed by thermal curing at a drying temperature of 150° C. to 200° C. Thus, resin electrode layers were formed. Further, a Ni plating layer and a Sn plating layer were formed on surfaces of the respective resin electrode layers.

The thickness of each resin electrode layer and the thickness of each Ni plating layer were adjusted as shown in Table 1. Thus, samples 1 to 19 were produced.

Then, these samples were heated in a reflow furnace at 260° C., and the occurrence or nonoccurrence of solder explosion was determined.

Each heated sample was cut in the LT direction, and an interface between the resin electrode layer and the Ni plating layer on the surface of the resin electrode layer was observed As shown in Table 1, the solder explosion was prevented in the samples in which the ratio of thickness of the resin electrode layer to thickness of the Ni plating layer was 5 or less.

In addition, the stress-induced peeling between the resin electrode layer and the Ni plating layer was prevented in the samples in which the Ni plating layer had a thickness of 8 μm or less.

REFERENCE SIGNS LIST 1 electrolytic capacitor
3 anode
3a valve-action metal foil
5 dielectric layer
7 cathode
7a solid electrolyte layer
7b conductive layer
7c cathode lead-out layer
8 sealing resin
9 resin molded body
9a first end surface of resin molded body
9b second end surface of resin molded body
9c bottom surface of resin molded body
9d top surface of resin molded body
9e first side surface of resin molded body 9f second side surface of resin molded body
11 first external electrode
11a, 13a inner plating layer
11a1, 13a1 Ni plating layer
11a2, 13a2 Ag plating layer
11b, 13b resin electrode layer
11b1, 13b1 Ag printed resin electrode layer
11c, 13c outer plating layer
11c1, 13c1 Ni plating layer
11c2, 13c2 Sn plating layer
13 second external electrode
20 capacitor element
30 stack

The invention claimed is:

1. An electrolytic capacitor comprising:
a resin molded body having opposed first and second end surfaces, the resin molded body including a stack that includes a capacitor element with an anode exposed at the first end surface, a dielectric layer on a surface of the anode, and a cathode opposite to the anode and exposed at the second end surface, and a sealing resin that encloses the stack;
a first external electrode on the first end surface of the resin molded body and electrically connected to the anode; and
a second external electrode on the second end surface of the resin molded body and electrically connected to the cathode,
wherein the first external electrode and the second external electrode each include:
 a resin electrode layer containing a conductive component and a resin component; and
 a Ni plating layer on a surface of the resin electrode layer, wherein
 a ratio of a thickness of the resin electrode layer to a thickness of the Ni plating layer is 5 or less,
 the resin electrode layer is between the Ni plating layer and the resin molded body, and
 the thickness of the Ni plating layer is 2 μm to 8 μm.

2. The electrolytic capacitor according to claim 1, wherein the ratio of the thickness of the resin electrode layer to the thickness of the Ni plating layer is 2 to 4.

3. The electrolytic capacitor according to claim 1, further comprising an inner plating layer on at least one of a surface of the anode exposed at the first end surface or a surface of the cathode exposed at the second end surface.

4. The electrolytic capacitor according to claim 3, wherein the inner plating layer includes an inner Ni plating layer and a Ag plating layer.

5. The electrolytic capacitor according to claim 3, wherein the inner plating layer covers an area larger than the surface of the anode exposed at the first end surface or the surface of the cathode exposed at the second end surface.

6. The electrolytic capacitor according to claim 1, wherein the resin electrode layer contains the resin component in an amount of 3 wt % to 33 wt %.

7. The electrolytic capacitor according to claim 1, further comprising a Sn plating layer on a surface of the Ni plating layer.

8. The electrolytic capacitor according to claim 1, wherein the resin electrode layer is an Ag printed resin electrode layer.

9. The electrolytic capacitor according to claim 1, wherein the conductive component is Ag, Cu, Ni, or Sn; and the resin component is an epoxy resin or a phenol resin.

10. The electrolytic capacitor according to claim 1, wherein the resin electrode layer contains the conductive component in an amount of 67 wt % to 97 wt % and the resin component in an amount of 3 wt % to 33 wt %.

11. The electrolytic capacitor according to claim 1, wherein the resin electrode layer contains the conductive component in an amount of 72 wt % to 95 wt % and the resin component in an amount of 5 wt % to 28 wt %.

12. The electrolytic capacitor according to claim 1, wherein the resin electrode layer contains the conductive component in an amount of 78 wt % to 95 wt % and the resin component in an amount of 5 wt % to 22 wt %.

13. The electrolytic capacitor according to claim 1, wherein the resin electrode layer contains the conductive component in an amount of 79 wt % to 89 wt % and the resin component in an amount of 11 wt % to 21 wt %.

* * * * *